Feb. 24, 1970                              G. HIRS                              3,497,063

METHOD OF AND APPARATUS FOR FILTERING

Filed Feb. 11, 1969                                                                                        3 Sheets-Sheet 1

INVENTOR.
GENE HIRS.
BY
SETTLE, BATCHELDER & OLTMAN.
ATT'YS.

Feb. 24, 1970    G. HIRS    3,497,063
METHOD OF AND APPARATUS FOR FILTERING
Filed Feb. 11, 1969    3 Sheets-Sheet 2

INVENTOR.
GENE HIRS.
BY
SETTLE, BATCHELDER & OLTMAN.
ATT'YS.

Feb. 24, 1970

G. HIRS 3,497,063

METHOD OF AND APPARATUS FOR FILTERING

Filed Feb. 11, 1969

INVENTOR.
GENE HIRS.
BY
SETTLE, BATCHELDER & OLTMAN.
ATT'YS.

United States Patent Office 3,497,063
Patented Feb. 24, 1970

3,497,063
METHOD OF AND APPARATUS FOR FILTERING
Gene Hirs, Birmingham, Mich., assignor to Hydromation Engineering Company, Livonia, Mich., a corporation of Michigan
Filed Feb. 11, 1969, Ser. No. 798,401
Int. Cl. B01d 37/02
U.S. Cl. 210—75                     12 Claims

ABSTRACT OF THE DISCLOSURE

The method and apparatus for filtering wherein a filter bed composed of finely divided particles is formed from a slurry in a filter chamber on a support structure which can be moved to remove the filter bed from the filter chamber. In a method embodiment of the invention, filtration is carried out until voids in the filter bed become at least partially clogged with contaminants. At least part of the filter chamber is then opened, and the support structure is moved to carry the filter bed out of the filter chamber. A clean support surface is positioned in the filter chamber in the path of fluid flow, and this clean support structure may be a portion of the original support structure or it may be a separate support structure like the original support structure if desired. A slurry of liquid and particles for the filter medium is then flowed past the clean support structure to form a new filter bed on the support, and filtration is then resumed.

---

An apparatus embodiment of the invention includes a filter chamber, at least part of which is openable, and an apertured support structure at least partly within the filter chamber and movable when the chamber is open for transporting a filter medium out of the chamber. A filter medium is provided on the support structure within the filter chamber, and this filter medium consists of finely divided particulate material of specific properties to be described herein, the filter medium being in the form of a bed positioned in a liquid flow path between an inlet and an outlet of the filter chamber. The apparatus also includes structure for supplying a slurry of particles and liquid to the support structure such that the slurry flows past the support structure and at least partly through openings in the support structure which are smaller than the particles so that a new filter bed is formed on the support structure. Thus, the filter may be operated in a filtration mode until the filter medium becomes at least partially clogged, and in a renewal mode wherein the support structure is moved to move the filter bed out of the filter chamber and a new filter bed is formed on the support structure by flow of a slurry.

RELATED APPLICATIONS

This application is related to four prior applications: namely, (1) application Ser. No. 671,903 filed on July 26, 1967, (2) application Ser. No. 681,391 filed on Nov. 8, 1967, now abandoned, (3) application Ser. No. 696,624 filed on Jan. 9, 1968, and (4) application Ser. No. 723,446 filed on Apr. 23, 1968. The present inventor is an inventor of all of the aforementioned prior applications.

BACKGROUND OF THE INVENTION

The above-identified prior applications disclose and claim a method of and apparatus for filtering which utilizes as the filter medium an organic polymeric material, such as polyvinyl chloride, polyethylene, polystyrene, wood sawdust or the like. These materials are light, have great structural strength and durability, and can be made very small or finely divided. All of these properties are desirable for filtration, and in particular facilitate the formation of the filter medium into a slurry for cleaning purposes.

By utilizing such filter media, it has been found that it is possible to obtain, concurrently, high flow rates, fine particle removal, and the retention of large amounts of dirt or contaminants in the filter medium of a filter. With respect to the high dirt retention capabilities of such a filter medium, it has been found by way of example that 4½ pounds of iron oxide per cubic foot of filter medium can be retained in a particulate filter medium bed utilizing the aforementioned materials.

In the earlier filed applications, various forms of back flushing and filter rejuvenation processes were disclosed. One form of back flushing was provided by rotatable back flush headers embedded in the bed of filter material; another form of back flush utilized elongated stationary pipes embedded in the medium bed at varying levels; and a third form of back flush utilized mechanical agitators also embedded in the filter medium bed.

With respect to filter rejuvenation processes, the prior applications disclosed a process wherein the filter medium and the dirt entrapped therein was formed into a slurry and transferred to a holding tank having a perforate wall through which the dirt and slurry were removed from the filter medium, following which the filter medium was placed in a slurry in a clean liquid and then returned to the filter bed location. Another form of rejuvenation was provided wherein the filter medium was formed into a slurry of filter medium granules, dirt particles and liquid which flowed past a screen with appreciable velocity while a proportion of the liquid and that corresponding proportion of the dirt suspended therein was withdrawn through the screen.

The present invention proposes a filter medium renewal method and apparatus for carrying out the method wherein the original partially clogged filter medium which has resulted from filtration is moved out of the filter chamber on the support structure on which it rests, and a new clean filter medium is formed on the same support structure or a like support structure by flow of a clean slurry past and at least partly through the apertured support structure.

SUMMARY OF THE INVENTION

In a method embodiment of the invention, filtration is carried out by passing contaminated liquid through a filter medium having specific properties to be described herein and then through an apertured support structure on which the filter medium is provided to trap contaminants from the liquid in voids of the filter medium while withdrawing clean liquid from the filter medium. Filtration is terminated after the filter medium becomes at least partially clogged. In accordance with the invention, the filter chamber is at least partly opened, and the support structure then moved to move the filter bed out of the filter chamber. A clean support structure, which may be the same as the original support structure or a like support structure, is moved into the filter chamber and interposed in a liquid flow path therein. In one embodiment, the clean support structure is a portion of a continuous apertured belt of which the original support structure is also a portion. A cleaned slurry of liquid and particles for the filter medium is then flowed past the support structure such that the support structure retains medium particles thereon and allows at least part of the liquid to pass through the apertures therein so as to build up a new filter bed on the support structure. Filtration is then resumed.

In an apparatus embodiment of the invention, a filter chamber is provided with a movable support structure between an inlet and an outlet thereof, and the filter chamber is provided with means for supplying a slurry containing filter medium particles and liquid to the support structure such that at least part of the liquid flows through the openings in the support structure and particles are retained on the support structure to build up a new filter bed. In a preferred embodiment, the support structure is an endless belt having apertures therein and having a run extending through the filter chamber. The filter chamber is at least partly openable to allow movement of the support belt. In this embodiment, spreader means is positioned in the flow path of the slurry ahead of the support structure for distributing the particles substantially uniformly on the support structure. The spreading means may be an apertured plate interposed in the flow path of the slurry and substantially parallel to the support structure, with the apertures in the plate being larger than the particles so as to distribute the particles. Spreading means aids in providing a level surface of particles at the top of the filter bed which is important to assure uniform flow of liquid through the filter medium.

Accordingly, it is an object of the present invention to provide a method and apparatus for filtering with a renewal cycle which can be carried out automatically.

Another object of the invention is to provide a method and apparatus for filtering with a renewal cycle in which a filter medium containing appreciable amounts of contaminants is transported out of a filter chamber and a clean filter medium is formed on a support structure in the filter chamber from a slurry.

A further important object of the present invention is to provide a method of and apparatus for filtering in which a filter medium having unusually great dirt retention capabilities is applied to an automatic filter of the flat bed type.

A further object of the invention is to provide a method and structure for distributing a slurry while it flows to and past an apertured support structure in a filter chamber so as to form a filter bed on the support structure which has a relatively level surface at the top of the particless after the filter bed is formed.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not for limitation.

Figure 1:
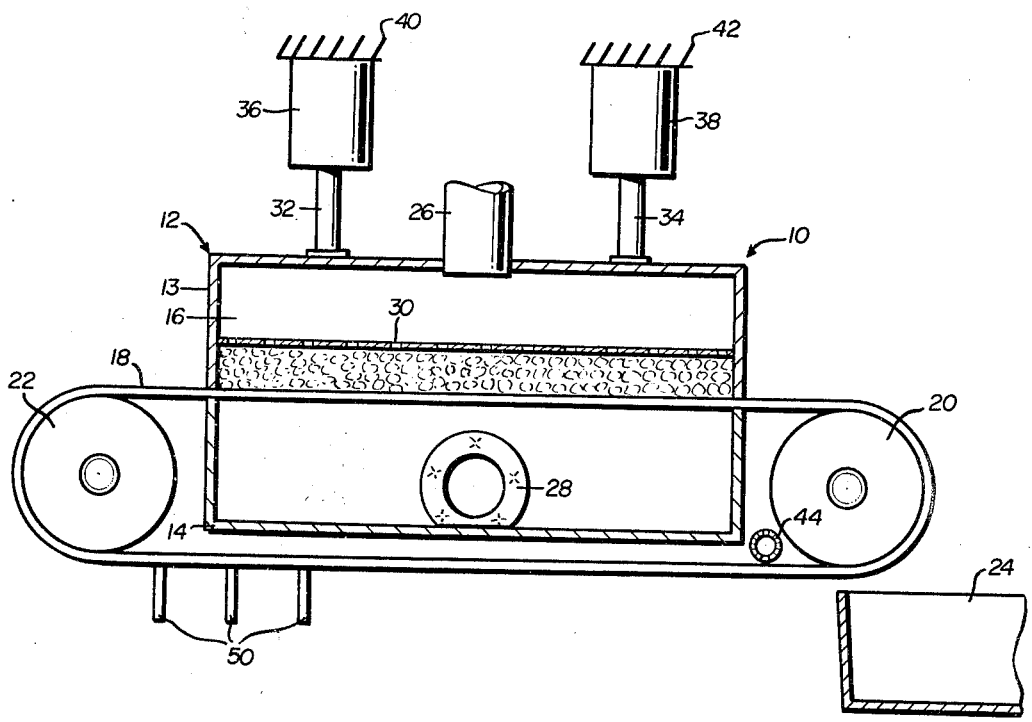
FIGURE 1 is a vertical sectional view of a filter apparatus in accordance with one embodiment of the invention.

As shown on the drawings:

Referring first to FIGURE 1, a filter apparatus 10 is shown which includes a filter casing 12 comprised of an upper shell 13 and a lower shell 14. The shells are each hollow and have an open face, and the shells are positioned with their open faces confronting each other to form the casing 12. The filter casing 12 is at least partly openable, and in the illustrated embodiment the upper shell 13 is movable vertically to open the filter casing. When the shells are closed, a chamber 16 is formed within the casing 12. It may be noted that it would not be essential for the entire upper shell 13 to be movable; it would be possible to provide a stationary upper shell and a stationary lower shell with movable doors at the longitudinal ends of upper shell 13 for partially opening the filter casing.

An apertured support structure in the form of an endless support belt 18 is provided, and the belt 18 is looped around drive sprockets 20 and 22 in driving relation so that rotation of one of the sprockets will move the support belt 18. The upper run of support belt 18 extends through the filter casing 12 and traverses the chamber 16. The confronting edges of the shells 13 and 14 may be provided with seals so that when the shells are closed on the upper run of the belt 18, a sealed chamber 16 is formed. A settling tank 24 shown below the right end of support belt 18.

A fluid inlet 26 leads into the top of upper shell 13, and a fluid outlet 28 leads out of the lower shell 14 as shown in FIGURE 1. The upper run of support belt 18 is positioned in the fluid flow path extending between the inlet 26 and the outlet 28.

In the embodiment of FIGURE 1, both the fluid to be filtered and a slurry containing particles of the filter medium are introduced into the upper shell 13 through the fluid inlet 26. This mode of operation of the apparatus will be described further later. It may be noted at this time, however, that a spreader plate 30 is mounted in upper shell 13 and traverses that shell in all horizontal directions. The spreader plate 30 has apertures or holes extending through it which are larger than any particles to be introduced through the inlet 26, either dirt particles or filter medium particles, so that all of the material entering through the inlet 26 can pass through the apertures of spreader plate 30. However, the plate 30 and the apertures in it act to spread out or distribute the flow of incoming fluid, and particularly the slurry from which a filter bed is formed as will be described, so that particles in the slurry are distributed uniformly on the support structure 18.

Connected to the upper shell 13 are pistons 32 and 34 respectively associated with cylinders 36 and 38 which are attached to overhead supports 40 and 42. The cylinders 36 and 38 may be actuated to move pistons 32 and 34 and thereby raise and lower the upper shell 13. In the illustrated embodiment, the upper shell is movable vertically, and the plate 30 and the upper run of support belt 18 are horizontal. A steam line 44 having nozzles or apertures associated with it is provided just above the lower run of the support belt 18 as shown in FIGURE 1 for purposes of cleaning the support belt as it is moved.

Figure 2:
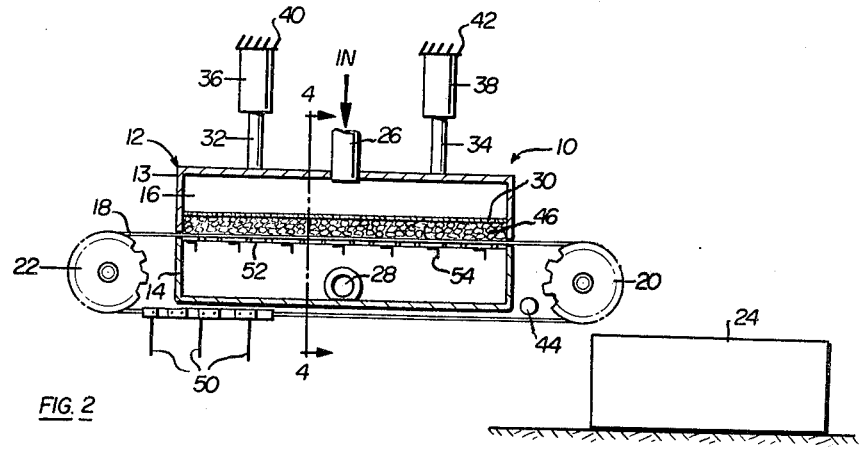
FIGURE 2 is a vertical sectional view very similar to FIGURE 1 showing a filter bed of particles formed on a movable support belt within a filter chamber of the apparatus.
Figure 3:
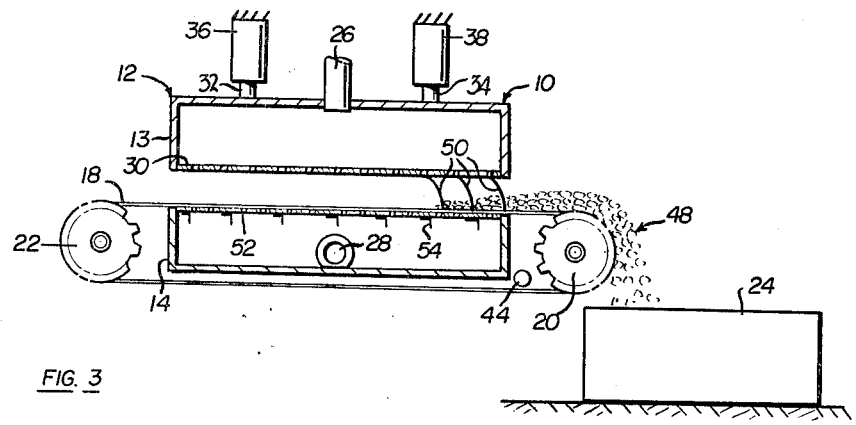
FIGURE 3 is a vertical sectional view of the apparatus of FIGURE 2 illustrating a stage in the method of the invention after the filter chamber has been opened and the support belt has been moved to move the filter bed out of the filter chamber.
Figure 4:
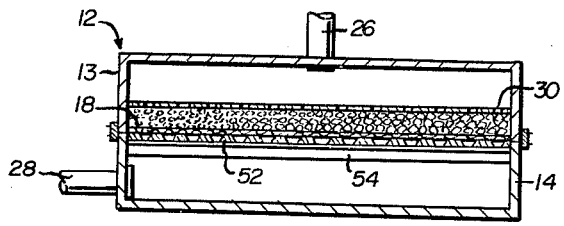
FIGURE 4 is a cross sectional view taken along line 4—4 of FIGURE 2.

FIGURES 2, 3 and 4 illustrate the operation of the apparatus of FIGURE 1, and also illustrate the method of filtering in accordance with the invention. Before describing the method, however, it may be noted that in FIGURE 2 a filter bed 46 which is a filter medium composed of finely divided particulate or granular material, is provided on support bed 18.

The bed 46 of granular filter medium may be composed of any one of several granular materials. Preferably, these materials include polyvinyl chloride, polyethylene, polystyrene and other polymeric resinous materials or wood sawdust of a size and shape such as defined in the earlier above-identified applications. As therein defined, the general body of particulate material suitable for this filter medium has a specific gravity of less than about 1.55, an average particle size in the range from 0.25 to 0.71 millimeter (or an average particle size in the range from 25 to 60 U.S. sieve number) and a porosity range of about 55 to 80%. The high porosity of such materials results in the filter medium having a relatively great capacity for retaining dirt or sludge, while the relatively fine particle size of the material makes it possible to provide a filter medium with less volume than known deep bed filters of the same type. For example, the depth of the filter medium may be from 6 to 18 inches and a typical depth is 12 inches.

Further, the particles are preferably of substantially uniform size, although the shapes may vary substantially. Polyvinyl chloride particles which are grown to size in an emulsion are preferred, inasmuch as they are spherical or oval in shape with a pock marked surface something like cauliflower or popcorn. Foamed particles of polystyrene also may be utilized, such particles being roughly spherical in shape. Polyethylene particles, which are prepared by shredding larger particles such as quarter inch cubes, are in the nature of shavings and the predominant shape is elongated, i.e. pencil-like, string-like and needle-like. The lightness of all of these particles, including the plate-like particles of sawdust, adds to the "slurrying" capabilities of the bed 46.

Such materials are "organic" in nature, being carbon compounds which are complicated synthetic or naturally essentially polymeric structures, in contrast to such previously used deep bed filter media as coal, sand, and the like.

The operation of the filter of FIGURES 1 through 4 and the method of the invention will be described starting with the filter in the condition shown in FIGURE 2 wherein the shells 13 and 14 are closed and the filter medium 46 is in place on the support belt 18. Contaminated liquid is passed under pressure through the inlet 26 and through the apertures in spreader plate 30 to the filter bed 46. The liquid passes through the filter bed under pressure at a flow rate of at least six gallons per minute per square foot of filter medium, and this liquid flows through the apertures in the support structure 18 into the bottom shell 14 and from there out through the outlet 28. As the liquid flows through filter medium, the contaminants such as dirt particles, slimes, or the like are trapped in voids in the filter medium. As previously pointed out, the filter medium 46 is capable of holding a large quantity of trapped dirt or other contaminants. However, the voids eventually become at least partially clogged, and when they are clogged with at least five cubic inches of contaminants per cubic foot of filter medium, the filtration is stopped by shutting off the pump which supplies contaminated liquid to inlet 26 by way of example.

A renewing cycle is then carried out as follows. The filter casing 13 is opened by actuating cylinders 36 and 38 to raise the upper shell 13. The drive means for the support belt 18 is energized to drive belt 18 clockwise as seen in the drawings and thereby move the filter bed 46 out of the filter chamber 16. The apparatus is shown in this condition in FIGURE 3; that is, the upper shell 13 is shown in a raised position and the support belt 18 is shown dumping particles of the filter medium at 48 into the tank 24. It may be noted in FIGURES 2 and 3 that flexible elongated scraper blades 50 are affixed to the support belt 18, and in FIGURE 3 these flexible blades have entered the filter casing and are scraping any residual filter particles from the bottom of the spreader plate 30. In FIGURES 2 and 3, a second apertured plate 52 is provided below the filter belt inside the lower shell 14, and the belt 18 rides on this plate 52. Plate 52 is supported by angle members 54. The holes in plate 52 are large enough to permit liquid to flow readily through it.

As the belt 18 continues to move, a clean support surface which is part of the support belt 18 moves into position within the filter casing 12. This clean surface may be the original surface on which the original filter medium 46 was located, or it may be a separate portion of the belt 18 as desired. It may be noted that it would also be possible to provide a different type of movable support structure for supporting the filter medium, and more than one such support structure could be used if desired.

The next step is flowing a slurry of liquid and particles for the filter medium past the clean support structure such that the support structure retains particles thereon and allows liquid to pass through it so as to build up a new filter bed on the support structure. This may be accomplished by pumping a slurry of filter medium particles and liquid in through inlet 26 and through spreader plate 30 onto support structure 18. The particles stop at support structure 18 and the liquid passes through support structure 18 and also through support plate 52 and exit through the outlet 28. As this slurry flows through the filter, it is spread out by the spreader plate 30. The liquid and the filter particles suspended therein tend to flow relatively uniformly through the areally distributed openings in the spreader plate 30 so as to provide a uniform deposit of particles on the support belt 18. The flow of slurry is preferably continued until all of the space between spreader plate 30 and support belt 18 is filled with filter medium particles. Thus, the spreader plate 30 also acts to level the top surface of the filter medium particles. This is desirable in order to achieve a uniform flow of liquid through the filter medium during filtration.

It may be noted that the slurry from which the filter bed is formed may be pumped at a faster flow rate than the flow rate achieved during filtration. If this is done, there is a tendency for the high pressure due to the high flow rate to compact the granules of the filter medium and thus reduce the size of the voids therein. It has been found that this greatly increases the capacity of the filter medium to retain a large amount of very fine dirt particles. A filter of this type shown in the drawings is especially suitable for filtering very fine particles, slimes, and other fine contaminants, and it is believed that this compaction step is desirable for a filter of this type.

After the filter bed of the appropriate thickness, say 6 to 12 inches, has been formed, the flow of slurry is terminated. Filtration is then resumed in the manner described previously.

Figure 6:
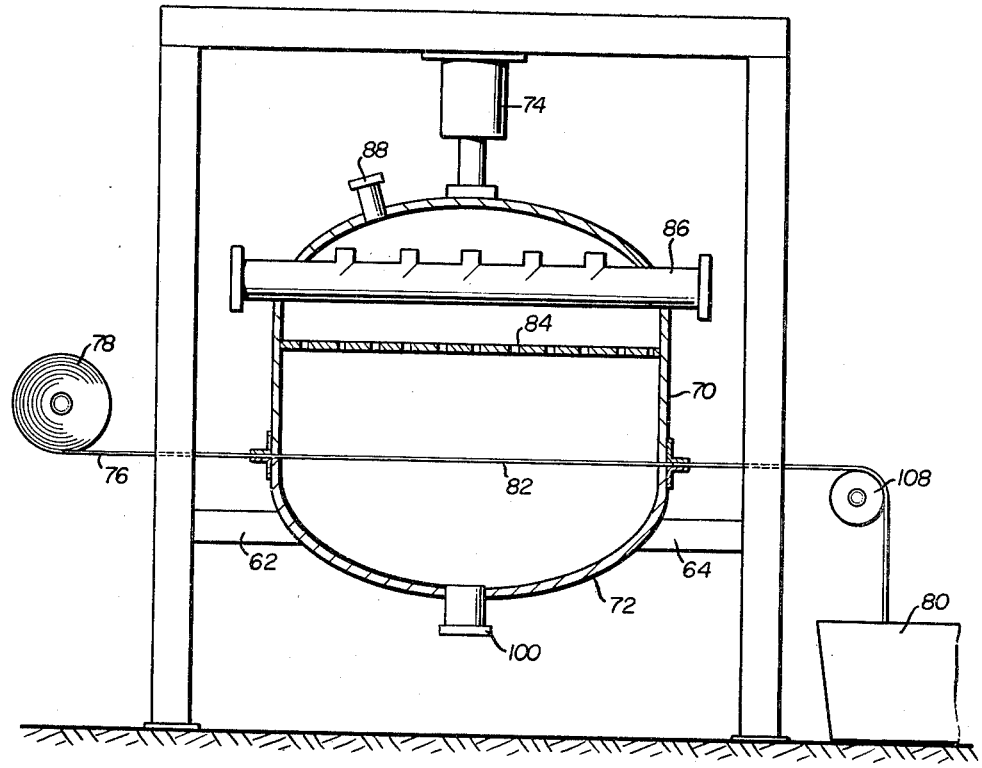
FIGURE 6 is a view of part of the apparatus of FIGURE 5 with the filter chamber being shown in section.
Figure 5:
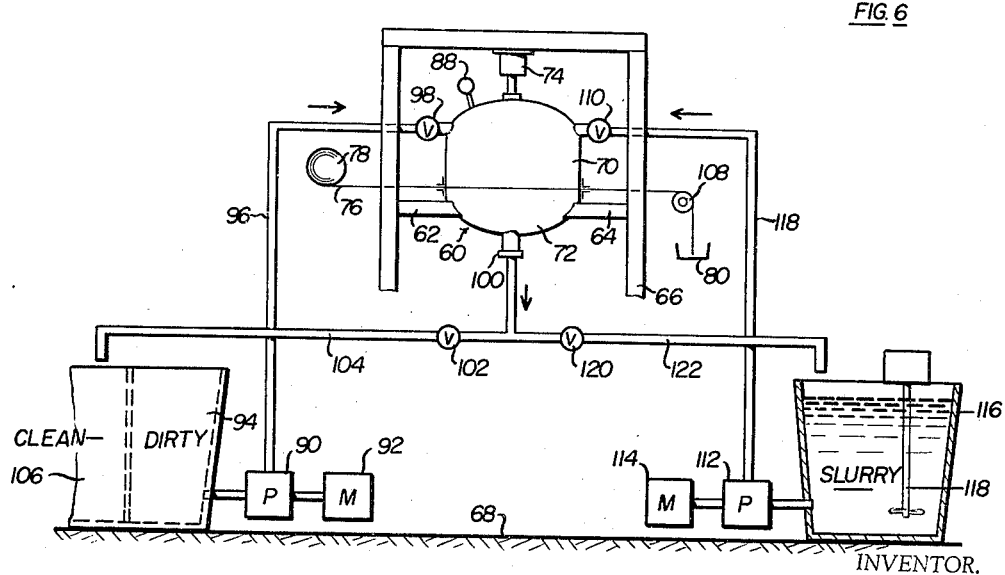
FIGURE 5 is a schematic view of a filter apparatus in accordance with one embodiment of the invention showing some of the hydraulic circuit associated with the apparatus.

FIGURES 5 and 6 show a somewhat modified form of the filter apparatus in accordance with the invention. Referring first to FIGURE 5, there is shown a filter casing 60 supported by legs 62 and 64 on a frame 66 above a floor 68. The casing 60 has an upper shell 70 and a lower shell 72, the lower shell 72 being stationary and the upper shell 70 being movable and actuated by means of a piston and cylinder device 74 in the manner described previously. A movable perforate support structure 76 extends between the shells 70 and 72, and this support structure is not an endless belt, but is rather a screen or web supplied from a roll 78 and disposed of at the other end in a tank 80. The support web 76 in passing through the shells 70 and 72 rides on a plate 82 which is shown in FIGURE 6. There are holes in plate 82 which are large enough to allow liquid to flow through the plate 82. There are holes in support web 76 smaller than the filter medium particles but large enough to allow dirt and contaminants to pass through the holes. Thus, the support web 76 serves the same purpose and acts in the same manner as the support belt 18 in the embodiment of FIGURES 1 through 4. Above the plate 82 there is a spreader plate 84 having apertures in it large enough to pass filter medium particles as well as dirt and liquid. A header 86 traverses the upper shell 70, and a blowdown inlet 88 is provided in the upper shell 70.

The operation of the embodiment of FIGURES 5 and 6 will be described starting in the condition where a filter medium (not shown in FIGURE 6) has already been formed on the support web 76 within the casing, and the casing or filter shells 70 and 72 are closed on the web. Contaminated liquid is pumped by a pump 90 driven by a motor 92 from a tank 94 through an inlet conduit 96 and a valve 98 into the upper shell 70. This contaminated liquid flows through the spreader plate 84, and the liquid flows through the filter medium while the contaminants therein are trapped in the filter medium in accordance with the previous description. The flow rates and other figures given in the previous description are applicable to this description as well. When the filter medium becomes clogged, the valve 98 is closed, and air under pressure is introduced through the blowdown inlet 88 to force remaining liquid through the filter medium into the lower shell 72. The outlet from the lower shell is at 100, and the clean liquid flowing out of this outlet flows through a valve 102 and a conduit 104 into a clean liquid tank 106. After blowdown is completed, the valve 102 is closed. The shells 70 and 72 are then opened by actuation of piston cylinder device 74. A drive for the roll 108 is actuated to pull the filter web through the filter casing and thus transport the filter medium out of the filter casing. At the same time, a clean support surface of support web 76 is positioned in the fluid flow path within the casing. The shells 70 and 72 are then closed again.

A valve 110 is then opened, and a pump 112 driven by motor 114 is actuated to pump a slurry from tank 116 through line 118 and valve 110 into the filter casing. The slurry is premixed in tank 116 by means of an agitator 118, and the slurry contains a liquid such as water and particles for the filter medium in accordance with the previous description.

The slurry is distributed by spreader plate 84 as it flows through it so as to deposit particles uniformly on the support web 76. The flow of slurry is continued until a bed of the desired thickness is formed, and the entire space between plates 82 and 84 may be filled. The liquid from the slurry is recycled to tank 116 through valve 120 and conduit 122. After a filter bed of appropriate thickness is built up, the flow of slurry is terminated.

Filtration is then resumed in accordance with the previous description.

Thus, it may be seen that an automatic filter which utilizes a filter bed of finely divided polymeric particles has been provided. The method of the invention can be carried out non-automatically if desired, but an automatic filter of this type may be desirable for some applications.

Having thus described my invention, I claim:

1. In a method of filtering a liquid containing contaminants smaller than about 50 microns by the steps of (a) retaining in a filter chamber a filter medium of finely divided particulate material having a specific gravity of less than about 1.55 in the form of a bed having voids therein on a perforate support having openings therethrough larger than said contaminants but smaller than the particles of the medium to prevent escape of the medium during filtration, (b) passing said contaminated liquid under pressure and at a flow rate of at least 6 gallons per square foot of medium per minute along a flow path through said filter medium and said support to trap contaminants from said liquid in said voids of said filter medium while withdrawing cleaned liquid from said filter medium, and (c) terminating the flow of contaminated liquid through said filter medium only after the voids therein become at least partially clogged with at least 5 cubic inches of contaminants per cubic foot of filter medium, the improvement steps of (1) opening at least part of said filter chamber, (2) moving said support to move said bed out of said filter chamber and to dispose of the same, (3) interposing a clean support which may be the same as the original support or like the same in said filter chamber in said flow path, (4) flowing a slurry of liquid and particles for said filter medium past said second named support with said second named support retaining such particles thereon and allowing liquid to pass through the openings therein so as to build up a new filter bed on said support, and (5) repeating steps (b) and (c).

2. In a method of operating a filter having an openable filter chamber and an apertured support to remove fine contaminants from a contaminated liquid by the steps of (a) retaining in said filter chamber a filter medium of finely divided particulate material having a specific gravity of less than about 1.55, an average particle size in the range from 25 to 60 U.S. sieve number and a porosity in the range from about 55% to about 80% in the form of a bed on a first portion of said movable support, the apertures in said support being sufficiently small to prevent escape of said filter medium while allowing the liquid to pass through, (b) passing said contaminated liquid under pressure along a flow path through said filter medium and then through said support to trap contaminants from the liquid in voids of said filter medium while withdrawing cleaned liquid from said filter medium, and (c) terminating the flow of contaminated liquid through said filter medium only after the voids therein become at least partially clogged, the improvement steps of (1) opening at least part of said filter chamber, (2) moving said support to move said bed and said first support portion out of said filter chamber while at the same time moving a second portion of said support into said chamber to a position interposed in said flow path, (3) flowing a slurry of liquid and particles for said filter medium past said second portion of said support with said second support portion retaining such particles thereon and allowing liquid to pass through the apertures therein so as to build up a new filter bed on said second support portion, and (4) repeating steps (b) and (c).

3. A method claimed in claim 1 or claim 2 in which during the step of flowing said slurry to build up a new filter bed the slurry is directed through a perforate spreading means to distribute the slurry substantially uniformly relative to said support in order to provide a relatively level medium surface at the top of said filter bed.

4. The method as claimed in claim 3 in which said spreading means is an apertured plate interposed in the flow path of the slurry between said support and an inlet in said filter chamber where the slurry is introduced, and in which the entire flow of slurry is directed through said spreader plate and said support to build up a bed of filter medium on said support in the space between said plate and said support.

5. The method as claimed in claim 4 in which said flow of slurry is continued for a time which is sufficient to substantially fill the space between said support and said spreader plate with filter medium particles to further assure that the top surface of said filter medium bed is level, said spreader plate being substantially horizontal and the portion of the support on which the filter bed is formed at any given time also being substantially horizontal.

6. The method as claimed in claim 2 in which said support is an endless belt having apertures therein and having a run extending through said filter chamber and movable when said filter chamber is open, said step (2) being carried out by driving said belt with a motor.

7. The method as claimed in claim 6 including the step of scraping said plate with flexible scrapers affixed to said belt during the moving of said belt in step (2).

8. In a filter apparatus including a casing forming a filter chamber at least part of which is openable, said casing having an inlet for contaminated liquid and an outlet for filtrate, an apertured support structure at least partly within said casing between said inlet and said outlet and movable when said casing is open for transporting a filter medium out of said casing, means for driving said support structure, means for supplying contaminated liquid to said inlet and means for withdrawing cleaned liquid from said outlet, the combination there-with of a filter medium on said support structure within said casing of a finely divided particulate material having a specific gravity of less than about 1.55, an average particle size in the range from 25 to 60 U.S. sieve number and a porosity in the range from about 55% to about 80%, said filter medium being in the form of a bed positioned in a liquid flow path between said inlet and said outlet to be traversed by contaminated liquid, and means for supplying said particles to said support structure in the form of a slurry, said support structure having openings therethrough smaller than said particles to prevent escape of said particles but large enough to allow cleaned liquid to pass through the same, whereby said filter may be operated in a filtration mode until said filter medium becomes at least partially clogged with contaminants and in a renewal mode wherein said support structure is moved to move said bed out of said casing and a new bed is formed on said support structure by flow of said slurry.

9. The filter apparatus as claimed in claim 8 further including spreader means positioned in the flow path of said slurry ahead of said support structure for distributing the particles substantially uniformly on said support structure.

10. The filter apparatus as claimed in claim 9 in which said spreading means is an apertured plate interposed in the flow path of the slurry ahead of said support structure and substantially parallel to said support structure, said plate having apertures therein larger than said particles for distributing said particles.

11. The filter apparatus as claimed in claim 10 in which said support structure is an endless belt having apertures therein and having a run extending through said filter casing.

12. The filter apparatus as claimed in claim 11 in which said belt carries scrapers for scraping said plate.

References Cited
UNITED STATES PATENTS

| | | | |
|---|---|---|---|
| 2,738,880 | 3/1956 | Whitney | 210—193 |
| 2,827,175 | 3/1958 | Cataldo | 210—193 X |
| 2,867,324 | 1/1959 | Hirs | 210—387 X |

SAMIH N. ZAHARNA, Primary Examiner

U.S. Cl. X.R.

210—79, 400